(12) United States Patent
Hirota et al.

(10) Patent No.: US 7,849,413 B2
(45) Date of Patent: Dec. 7, 2010

(54) INFORMATION PROCESSING APPARATUS AND USER INTERFACE CONTROL METHOD

(75) Inventors: Makoto Hirota, Tokyo (JP); Kenichiro Nakagawa, Tokyo (JP); Hiromi Omi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 771 days.

(21) Appl. No.: 11/782,995

(22) Filed: Jul. 25, 2007

(65) Prior Publication Data

US 2008/0028327 A1 Jan. 31, 2008

(30) Foreign Application Priority Data

Jul. 27, 2006 (JP) .............................. 2006-205312

(51) Int. Cl.
*G06F 3/048* (2006.01)
*G06F 3/00* (2006.01)

(52) U.S. Cl. ...................... 715/763; 715/744; 715/746; 715/747; 715/762; 715/764

(58) Field of Classification Search ................. 715/747, 715/762, 797, 862, 744, 746; 717/106
See application file for complete search history.

(56) References Cited

U.S. PATENT DOCUMENTS

| 6,167,411 | A | * | 12/2000 | Narayanaswamy | 715/217 |
| 6,546,419 | B1 | * | 4/2003 | Humpleman et al. | 709/223 |
| 7,089,583 | B2 | * | 8/2006 | Mehra et al. | 726/3 |
| 7,487,464 | B2 | * | 2/2009 | Grotjohn et al. | 715/797 |
| 2003/0071860 | A1 | * | 4/2003 | Goddard et al. | 345/866 |
| 2003/0158898 | A1 | * | 8/2003 | Hirota et al. | 709/204 |
| 2003/0164859 | A1 | * | 9/2003 | Evans | 345/792 |
| 2004/0218451 | A1 | * | 11/2004 | Said et al. | 365/222 |
| 2005/0060046 | A1 | | 3/2005 | Ito et al. | 700/17 |
| 2005/0076306 | A1 | * | 4/2005 | Martin et al. | 715/747 |
| 2005/0193368 | A1 | * | 9/2005 | Becker et al. | 717/106 |
| 2006/0168536 | A1 | * | 7/2006 | Portmann | 715/762 |
| 2006/0224961 | A1 | | 10/2006 | Omi et al. | 715/700 |
| 2006/0290709 | A1 | * | 12/2006 | Omi et al. | 345/594 |
| 2008/0263462 | A1 | * | 10/2008 | Mayer-Ullmann et al. | 715/762 |

FOREIGN PATENT DOCUMENTS

| JP | 11-102293 | 4/1999 |
| JP | 2000-10769 | 1/2000 |
| JP | 2001-325098 | 11/2001 |
| JP | 2004-164208 | 6/2004 |
| JP | 2005-092504 | 4/2005 |

\* cited by examiner

*Primary Examiner*—Weilun Lo
*Assistant Examiner*—Nicholas Augustine
(74) *Attorney, Agent, or Firm*—Fitzpatrick, Cella, Harper & Scinto

(57) ABSTRACT

There is provided an information processing apparatus which allows a user interface implemented in a description language such as XML or the like to re-use a widget. A user interface description document can describe a command to allocate a widget with reference to a widget description document that describes the definition of the widget of the user interface. When the user interface description document describes the command, the information processing apparatus refers to the widget description document and generates structured data which expresses the contents that integrate the user interface description document and widget description document. The apparatus displays the user interface based on the generated structured data, and executes an operation in response to an input event from the user.

11 Claims, 21 Drawing Sheets

BUTTON IN NORMAL STATE

BUTTON IN DEPRESSED STATE

FIG. 13

DOCUMENT EXAMPLE 1 (button.html)

```xml
<?xml version="1.0" encoding="UTF-8"?>
<html
    xmlns=http://www.w3.org/1999/xhtml
xmlns:ev="http://www.w3.org/2001/xml-events"
xmlns:cmm="http://www.cmm.com">
<head>
    <!-- DESCRIPTION OF BEHAVIOR -->
    <cmm:interaction initial="State1">                              ······(1)
        <cmm:state name="State1">                                   ······(2)
            <ev:listener ev:event="mousedown" ev:observer="ImageUp">
                                                                    ······(3)
                <cmm:operate name="Hide" component="ImageUp"/>      ···(4)
                <cmm:operate name="Show" component="ImageDown"/>    ···(5)
            </ev:listener>
            <ev:listener ev:event="mouseup" ev:observer="ImageDown">
                                                                    ······(6)
                <cmm:operate name="Hide" component="ImageDown"/>
                <cmm:operate name="Show" component="ImageUp"/>
            </ev:listener>
        </cmm:state>
    </cmm:interaction>
</head>
<body>
    <!-- IMAGE REPRESENTING NORMAL STATE OF BUTTON -->
    <img src="images/up1.bmp" id="ImageUp" name="ImageUp"
        style="width:129px;height:88px;top:0px;left:0px;"/>         ······(7)
    <!-- IMAGE REPRESENTING DEPRESSED STATE OF BUTTON -->
    <img src="images/down1.bmp" id="ImageDown" name="ImageDown"
        style="width:129px;height:88px;top:0px;left:0px;visibility=hidden;"/>
                                                                    ······(8)
</body>
</html>
```

FIG. 14

DOCUMENT EXAMPLE 2 (UISample1.html)

```
<?xml version="1.0" encoding="UTF-8"?>
<html
    xmlns=http://www.w3.org/1999/xhtml
xmlns:ev="http://www.w3.org/2001/xml-events"
xmlns:cmm="http://www.cmm.com">
<head/>
   <body>
      <!-- BUTTON 1 -->
      <cmm:CustomControl id="button1" definition="button.html"
                  style="width:129px;height:88px;top:62px;left:40px;"/>
                                                                      .....(1)
      <!-- BUTTON 2 (AFTER IMAGE IS REPLACED) -->
      <cmm:CustomControl id="button2" definition="button.html"
                  style="width:129px;height:88px;top:62px;left:220px;">
                                                                      .....(2)
         <cmm:property targetID="ImageUp" targetattribute="src"
                                          value="images/up2.bmp"/>
                                                                      .....(3)
         <cmm:property targetID="ImageDown" targetattribute="src"
                                          value="images/down2.bmp"/>
                                                                      .....(4)
      </cmm:CustomControl>
   </body>
</html>
```

FIG. 15A

DOCUMENT EXAMPLE 3 (slider.html)

```xml
<?xml version="1.0" encoding="UTF-8"?>
<html
    xmlns=http://www.w3.org/1999/xhtml
xmlns:ev="http://www.w3.org/2001/xml-events"
xmlns:cmm="http://www.cmm.com">
<head>
    <!-- DESCRIPTION OF BEHAVIOR OF SLIDER -->
    <cmm:interaction initial="state0">
        <cmm:state name="state0">                                        ······(1)
            <ev:listener ev:event="entry">
                                                                         ······(2)
                <cmm:operate name="Show" component="imgSlider0"/>
            </ev:listener>
            <ev:listener ev:event="exit">
                                                                         ······(3)
                <cmm:operate name="Hide" component="imgSlider0"/>
            </ev:listener>
            <ev:listener ev:event="operation.MoveRight">
                                                                         ······(4)
                <cmm:goto href="#state1"/>           ······(5)
            </ev:listener>
        </cmm:state>
        <cmm:state name="state1">                                        ······(6)
            <ev:listener ev:event="entry">                               ······(7)
                <cmm:operate name="Show" component="ImgSlider1"/> ······(8)
            </ev:listener>
            <ev:listener ev:event="exit">
                <cmm:operate name="Hide" component="ImgSlider1"/>
            </ev:listener>
            <ev:listener ev:event="operation.MoveLeft">
<cmm:goto href="#state0"/>
            </ev:listener>
            <ev:listener ev:event="operation.MoveRight">
```

FIG. 15B

```
<cmm:goto href="#state2"/>
        </ev:listener>
     </cmm:state>
     <cmm:state name="state2">
        <ev:listener ev:event="entry">
           <cmm:operate name="Show" component="ImgSlider2"/>
        </ev:listener>
        <ev:listener ev:event="exit">
           <cmm:operate name="Hide" component="ImgSlider2"/>
        </ev:listener>
        <ev:listener ev:event="operation.MoveLeft">
<cmm:goto href="#state1"/>
        </ev:listener>
        <ev:listener ev:event="operation.MoveRight">
<cmm:goto href="#state3"/>
        </ev:listener>
     </cmm:state>
     <cmm:state name="state3">
        <ev:listener ev:event="entry">
           <cmm:operate name="Show" component="ImgSlider3"/>
        </ev:listener>
        <ev:listener ev:event="exit">
           <cmm:operate name="Hide" component="ImgSlider3"/>
        </ev:listener>
        <ev:listener ev:event="operation.MoveLeft">
<cmm:goto href="#state2"/>
        </ev:listener>
     </cmm:state>
   </cmm:interaction>
 </head>
 <body>
    <!-- IMAGE OF SLIDER WITH KNOB AT LEFTMOST POSITION -->
    <img src="images/slider0.bmp" id="ImgSlider0"
              style="width:256px;height:22px;top:0px;left:0px;"/>      ······(9)
```

FIG. 15C

```
<!-- IMAGE OF SLIDER WITH KNOB AT SECOND LEFTMOST POSITION -->
<img src="images/slider1.bmp" id="ImgSlider1"
     style="width:256px;height:22px;top:0px;left:0px;visibility=hidden;"/>
                                                              ······(10)
<!-- IMAGE OF SLIDER WITH KNOB AT THIRD LEFTMOST POSITION -->
<img src="images/slider2.bmp" id="ImgSlider2"
     style="width:256px;height:22px;top:0px;left:0px;visibility=hidden;"/>
                                                              ······(11)
<!-- IMAGE OF SLIDER WITH KNOB AT RIGHTMOST POSITION -->
<img src="images/slider3.bmp" id="ImgSlider3"
     style="width:256px;height:22px;top:0px;left:0px;visibility=hidden;"/>
                                                              ······(12)
</body>
</html>
```

F I G. 16

DOCUMENT EXAMPLE 4 (UISample2.html)

```
<?xml version="1.0" encoding="shift-JIS"?>
<html
    xmlns=http://www.w3.org/1999/xhtml
xmlns:ev="http://www.w3.org/2001/xml-events"
xmlns:cmm="http://www.cmm.com">
<head>
    <!-- DESCRIPTION OF BEHAVIOR -->
    <cmm:interaction initial="stateCommon">
        <cmm:state name="stateCommon">
            <ev:listener ev:event="click" ev:observer="Left">
                <cmm:operate name="MoveLeft" component="Slider"/>
                                                                        ······(1)
            </ev:listener>
            <ev:listener ev:event="click" ev:observer="Right">
                <cmm:operate name="MoveRight" component="Slider"/>
                                                                        ······(2)
            </ev:listener>
        </cmm:state>
    </cmm:interaction>
</head>
<body>
    <!-- RIGHT ARROW BUTTON -->
    <input type="button" id="Right" name="Right" value="→"
            style="width:40px;height:40px;top:130px;left:180px;"/>   ······(3)
    <!-- LEFT ARROW BUTTON -->
    <input type="button" id="Left" name="Left" value="←"
            style="width:40px;height:40px;top:130px;left:120px;"/>   ······(4)
    <!-- SLIDER -->
    <cmm:CustomControl id="Slider" definition="slider.html"
            style="width:257px;height:22px;top:80px;left:40px;"/>    ······(5)
</body>
</html>
```

FIG. 17

DOCUMENT EXAMPLE 5 (SoundButton.html)

```xml
<?xml version="1.0" encoding="UTF-8"?>
<html
    xmlns=http://www.w3.org/1999/xhtml
xmlns:ev="http://www.w3.org/2001/xml-events"
xmlns:cmm="http://www.cmm.com">
<head>
    <!-- DESCRIPTION OF BEHAVIOR -->
    <cmm:interaction initial="State1">
        <cmm:state name="State1">
            <ev:listener ev:event="mousedown" ev:observer="ImageUp">
                <cmm:operate name="Hide" component="ImageUp"/>
                <cmm:operate name="Show" component="ImageDown"/>
                <cmm:operate name="Play" component="Sound1"/>          ····(1)
            </ev:listener>
            <ev:listener ev:event="mouseup" ev:observer="ImageDown">
                <cmm:operate name="Hide" component="ImageDown"/>
                <cmm:operate name="Show" component="ImageUp"/>
            </ev:listener>
        </cmm:state>
    </cmm:interaction>
</head>
<body>
    <!-- IMAGE REPRESENTING NORMAL STATE OF BUTTON -->
    <img src="images/up1.bmp" id="ImageUp" name="ImageUp"
        style="width:129px;height:88px;top:0px;left:0px;"/>
    <!-- IMAGE REPRESENTING DEPRESSED STATE OF BUTTON -->
    <img src="images/down1.bmp" id="ImageDown" name="ImageDown"
        style="width:129px;height:88px;top:0px;left:0px;visibility=hidden;"/>
    <!-- SOUND OUTPUT -->
    <cmm:audio id="Sound1" src="sound/chime1.wav"/>          ····(2)
</body>
</html>
```

FIG. 18

DOCUMENT EXAMPLE 6 (UISample3.html)

```xml
<?xml version="1.0" encoding="UTF-8"?>
<html
    xmlns=http://www.w3.org/1999/xhtml
xmlns:ev="http://www.w3.org/2001/xml-events"
xmlns:cmm="http://www.cmm.com">
<head/>
   <body>
      <!-- BUTTON 1 -->
      <cmm:CustomControl id="button1" definition="SoundButton.html"
                style="width:129px;height:88px;top:62px;left:40px;"/>
      <!-- BUTTON 2 (AFTER IMAGE IS REPLACED) -->
      <cmm:CustomControl id="button2" definition="SoundButton.html"
                style="width:129px;height:88px;top:62px;left:220px;">
         <cmm:property targetID="ImageUp" targetattribute="src"
                                         value="images/up2.bmp"/>
         <cmm:property targetID="ImageDown" targetattribute="src"
                                         value="images/down2.bmp"/>
         <cmm:property targetID="Sound1" targetattribute="src"
                                         value="sound/chime2.wav"/>   ・・・(1)
      </cmm:CustomControl>
   </body>
</html>
```

FIG. 19

DOCUMENT EXAMPLE 7 (UISample4.html)

```xml
<?xml version="1.0" encoding="UTF-8"?>
<html
   xmlns=http://www.w3.org/1999/xhtml
xmlns:ev="http://www.w3.org/2001/xml-events"
xmlns:cmm="http://www.cmm.com">
<head/>
   <body>
      <!-- BUTTON 1 -->
      <cmm:CustomControl id="button1" definition="http://widgets/button.html"
                  style="width:129px;height:88px;top:62px;left:40px;"/>
                                                              ·····(1)
      <!-- BUTTON 2 (AFTER IMAGE IS REPLACED) -->
      <cmm:CustomControl id="button2" definition="http://widgets/button.html"
                  style="width:129px;height:88px;top:62px;left:220px;">
                                                              ·····(2)
         <cmm:property targetID="ImageUp" targetattribute="src"
                                       value="images/up2.bmp"/>
         <cmm:property targetID="ImageDown" targetattribute="src"
                                       value="images/down2.bmp"/>

</cmm:CustomControl>
   </body>
</html>
```

INFORMATION PROCESSING APPARATUS AND USER INTERFACE CONTROL METHOD

BACKGROUND OF THE INVENTION

1. Field of the Invention

The present invention relates to an information processing apparatus and user interface control method, which implement a user interface based on a user interface description language.

2. Description of the Related Art

A technique which describes a user interface using a description language such as XML or the like, and implements the user interface by executing the description language on a browser is known. HTML and a Web browser, which are prevalent currently, are an example of such technique. For example, SVG (Scalable Vector Graphics), which is described in Japanese Patent Laid-Open No. 2004-164208 and is designed by W3C (World Wide Web Consortium, http://www.w3c.org), is also an XML-based description language. Also, VoiceXML, which is also designated by W3C, is a language that describes interactions by means of voice.

It is a common practice to configure a user interface using "widgets" such as buttons, sliders, pull-down menus, and the like. Widgets of the same type have the same properties, such as a button which "appears depressed when pushed". By creating widgets and laying them out on a user interface, the developer of the user interface need not program the "appears depressed when pushed" behavior or the like.

On the other hand, widgets are not merely allocated but often have different colors or different character strings depending on the use intended. For example, a button that represents "OK" and a button that represents "cancel" have a common "appears depressed when pushed" behavior. However, different character strings are displayed on these buttons, and these buttons may often be expressed using different bitmap files depending on the design of the user interface.

In the case of HTML, some GUI widgets such as a button expressed by <input type="button">, a pull-down menu expressed by <select>, and the like are defined. However, the appearances of these widgets which are prepared in advance are regulated by a browser, and it is difficult to freely customize their appearances.

By contrast, a GUI with a high visual effect can be built using SVG. SVG describes a GUI by combinations of vector expressions such as lines, rectangles, paths, and the like. However, no widgets with high levels of abstraction such as buttons and the like are prepared, and description in SVG becomes complicated since it is implemented by combinations of vector expressions. It is possible to re-use an SVG document at a reference destination by referring to another SVG file using an <image> element. However, this element merely allows re-use of display but does not allow re-use of an actual widget with an "appears depressed when pushed" behavior.

sXBL (http://www.w3.org/TR/sXBL/), which is currently designed by W3C, is attracting attention as a method capable of solving the widget-definition problem of SVG. Using sXBL, a button or the like is described by SVG and can be defined as a widget together with a behavior "appear depressed when pushed". A widget described in this way can be loaded and re-used in another SVG document. However, sXBL is a language distinct from SVG, and when an existing SVG document is re-used in another SVG document as a widget of a user interface, sXBL cannot intervene.

The HTML <frame> or <iframe> tags are a mechanism used to display another page in a frame of a given page (i.e., a mechanism that allows re-use of existing HTML data in other HTML data). However, interactions allowed between parent HTML data and that in a frame are limited. For example, even when two identical buttons are allocated on a user interface, they often have different colors or different bitmap patterns. However, <frame> or <iframe> cannot change the attributes (colors, bitmaps, and the like) of HTML data in a frame using a description of parent HTML data.

SUMMARY OF THE INVENTION

It is an object of the present invention to allow description of widgets, which configure a user interface, using a user interface description language, and to facilitate widget re-use.

According to one aspect of the present invention, an information processing apparatus which allows a user interface implemented by in a description language such as XML or the like to re-use a widget is provided. A user interface description document can describe a command to allocate a widget with reference to a widget description document that describes the definition of the widget of the user interface. When the user interface description document describes the command, the information processing apparatus refers to the widget description document and generates structured data which expresses the contents that integrate the user interface description document and widget description document. The apparatus displays the user interface based on the generated structured data, and executes an operation in response to an input event from the user.

Further features of the present invention will become apparent from the following description of exemplary embodiments with reference to the attached drawings.

BRIEF DESCRIPTION OF THE DRAWINGS

FIG. 13 shows an example of a user interface description document that describes a button widget according to the first embodiment;

FIG. 14 shows another example of a user interface description document that uses the button widget defined by FIG. 13;

FIGS. 15A to 15C show an example of a user interface description document which describes a slider widget according to the second embodiment;

FIG. 16 shows an example of a user interface description document that uses the slider widget defined by FIGS. 15A to 15C;

FIG. 17 shows an example of a user interface description document including a description about a voice output according to the third embodiment;

FIG. 18 shows an example of a user interface description document that uses a widget defined by FIG. 17; and FIG. 19 shows an example of a user interface description document held by a UI server according to the fifth embodiment.

DESCRIPTION OF THE EMBODIMENTS

Various exemplary embodiments, features, and aspects of the present invention will be described in detail below with reference to the drawings.

First Embodiment

Figure 3:
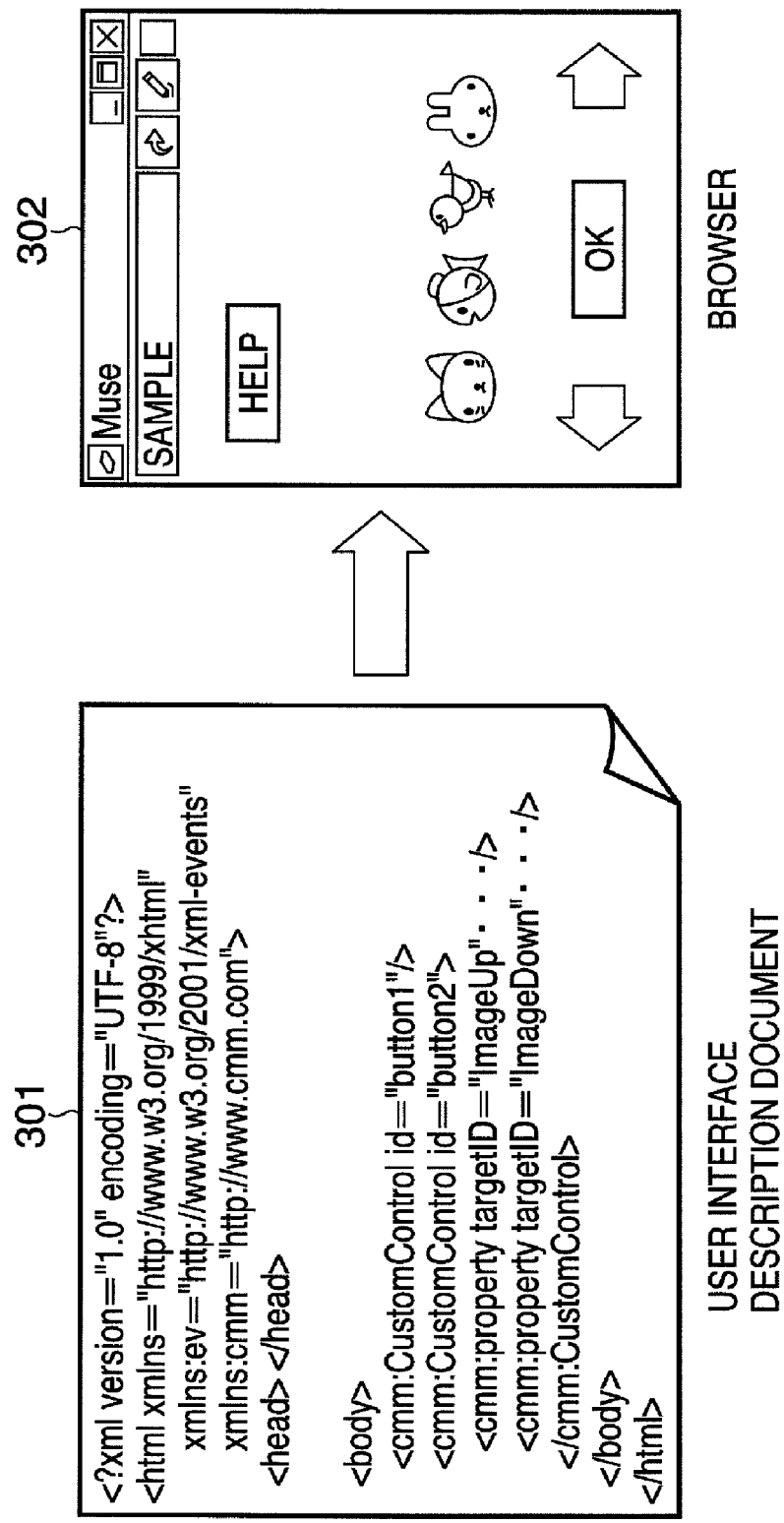
FIG. 3 shows an example of a user interface description document and a browser which processes that document.

This embodiment will explain a case wherein a "button" as a representative widget of a GUI (graphical user interface) is created using an XML-based user interface description document. In the following description, a "user interface" will be referred to as a "UI", and a widget of the GUI will be referred to as a "GUI widget". A UI description document is a document described using XML like a document 301 in FIG. 3. When a browser 302 running on a personal computer (PC) parses and executes this document, the UI of this embodiment is implemented.

Figure 1:
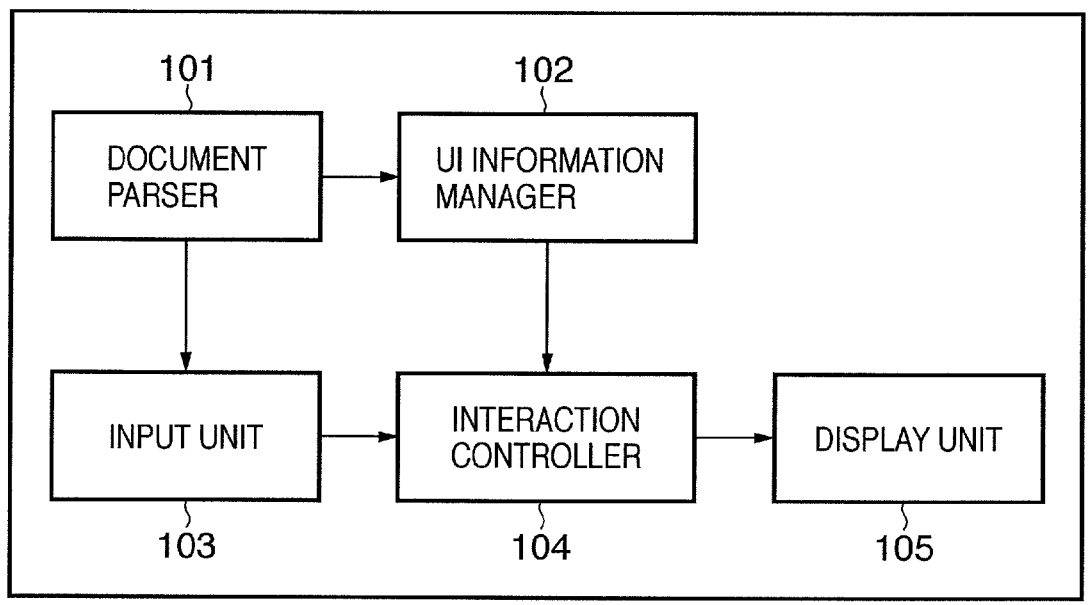
FIG. 1 is a block diagram showing the functional arrangement of a browser.

FIG. 1 is a block diagram showing the functional arrangement of the browser 302 according to this embodiment.

Referring to FIG. 1, reference numeral 101 denotes a document parser, which parses the UI description document 301. Reference numeral 102 denotes a UI information manager, which manages UI information obtained as the parsing result of the document parser 101. Reference numeral 103 denotes an input unit which accepts user input. Reference numeral 104 denotes an interaction controller which controls the UI based on UI behavior information included in the UI description document 301. Reference numeral 105 denotes a display unit which displays the UI based on display information included in the UI description document 301.

Figure 2:
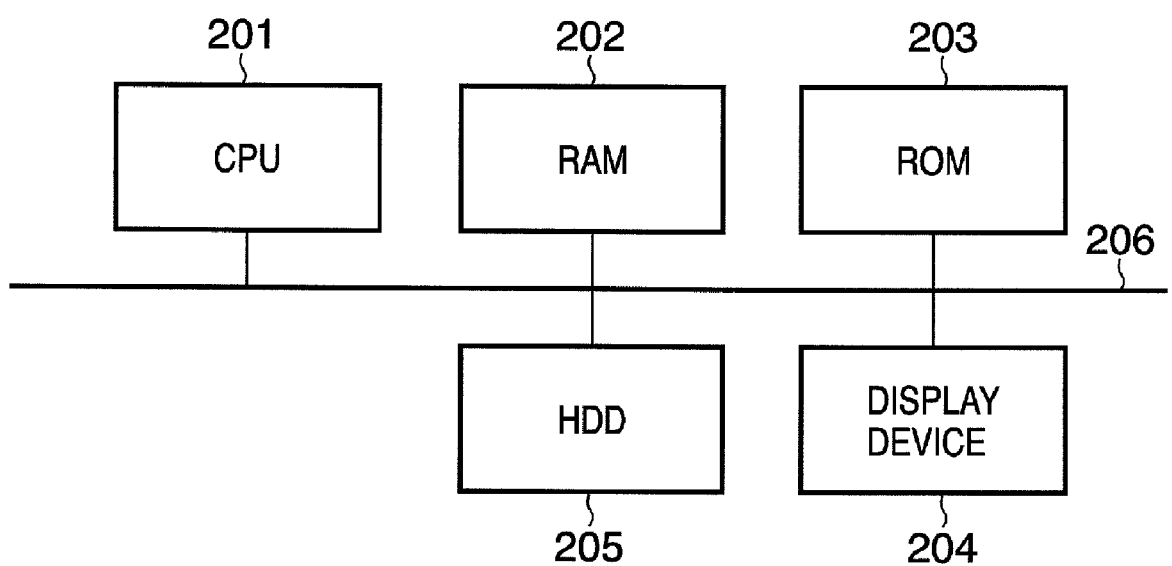
FIG. 2 is a block diagram showing the hardware arrangement of a PC.

FIG. 2 is a block diagram showing the hardware arrangement of a PC according to this embodiment.

Referring to FIG. 2, reference numeral 201 denotes a CPU which controls the operation of this PC. Reference numeral 202 denotes a RAM which provides a work area for the CPU 201. Reference numeral 203 denotes a ROM which stores permanent data and programs. Reference numeral 204 denotes a display device. Reference numeral 205 denotes a hard disk which stores the UI description document 301, browser 302, and the like. Reference numeral 206 denotes a bus.

A UI description document which implements a button will be described below. A document "button.html" as document example 1 shown in FIG. 13 is a description example of a button. This embodiment describes a button based on XHTML (http://www.w3.org/TR/xhtml1/) as the standard language specification designated by W3C. In the document button.html, an <img> element in (7) and (8) is an element which expresses an image defined by XHTML as "output information". An "src" attribute designates an image file to be displayed. A "style" attribute designates display attributes such as the display position, size, and the like of that image. The display attributes used in this document are as follows:

top: the y-coordinate of a display position, which indicates the number of points downward from the top of the screen where the display position is located.

left: the x-coordinate of a display position, which indicates the number of points rightward from the left end of the screen where the display position is located.

width: the horizontal size of a widget.

height: the vertical size of a widget.

visibility: whether or not that image is to be displayed in an initial state.

Figure 4A:
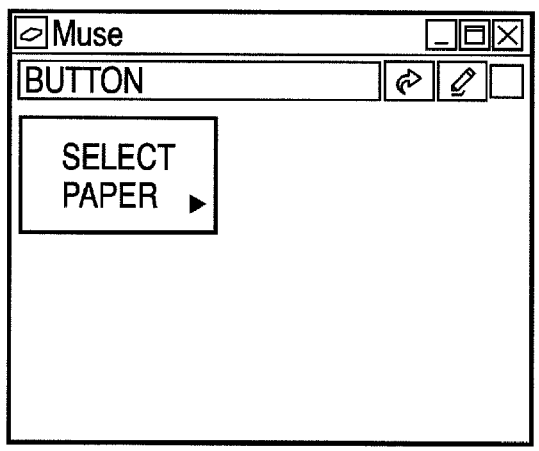
FIGS. 4A and 4B show display examples upon executing a user interface description document of a button by the browser.

The <img> element in (7) displays a bitmap file "images/up1.bmp" at the upper left corner of the screen. On the other hand, the <img> element in (8) displays a bitmap file "images/down1.bmp" at the same position. However, since its "visibility" attribute value is "hidden", this image is hidden in an initial state. This bitmap file expresses a button in a depressed state. That is, (8) is an example of an image designation description that designates an image which expresses a GUI widget upon application of an operation. FIG. 4A shows the display state of button.html by the browser 302.

In FIG. 13, a <cmm:interaction> element and its child elements in (1) are unique specifications which are not included in those of XHTML. (1) describes a behavior of a button as "control information". A <cmm:state> element in (2) represents the state, an <ev:listener> element in (3) represents an event which occurs in that state, and their child elements in (4), (5), and the like express actions to be taken when that event has occurred.

The event expression in (3) uses XML Events (http://www.w3.org/RT/xml/events/) according to the specification of the W3C. (3) means that an "mousedown" event has occurred for a target "ImageUp". "ev:observer" is an ID reference, and indicates an element having "ImageUp" as an ID; that is, the <img> element in (7). Therefore, (3) means the event "a mouse button is held down on the bitmap of (7)". In this manner, the document button.html describes operation information indicating the types of operation for the button.

A <cmm:operate> element in (4) means an operation of an object. A "name" attribute is an operation name, and "Hide' is an operation "to hide" an object. A "component" attribute is an ID reference of an object to be operated, and "ImageUp" indicates the <img> element in (7). That is, (4) represents an action "to hide the bitmap of (7)".

Likewise, (5) means "to display the bitmap of (8)".

Figure 4B:
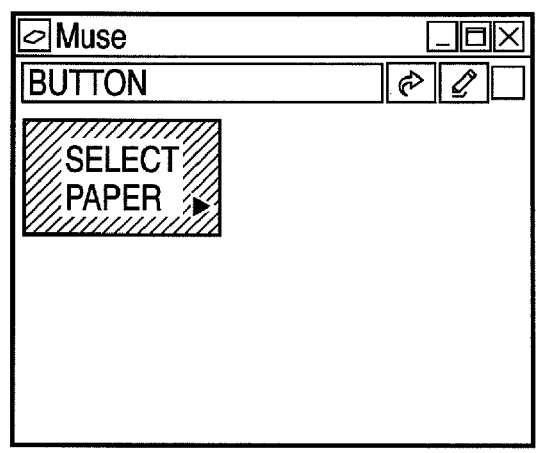

To summarize, this document describes a behavior in that when the mouse button is held down on the bitmap of (7), which represents a button in a normal state, the display state of the button is switched to the bitmap that represents the button in the depressed state. In practice, when the browser 302 executes the operation described here, the display state of the browser 302 when the mouse button is held down on the bitmap of (7) is as shown in FIG. 4B.

Similarly, a range bounded by the <ev:listener> element in (6) expresses that when the mouse button is released on the bitmap of (8), the display state is switched to (7) as the button expression in the normal state. In this manner, a button which "appears depressed when clicked" can be expressed.

The operation described so far can be implemented even using the prior art. For example, an HTML document can describe a behavior based on an event or the like using JavaScript. When this document is executed by a Web browser, the aforementioned button can be implemented. However, in general, on a UI, not only one button but also a plurality of buttons are often allocated on a single screen. In addition, these allocated buttons normally have different colors, pictures, character strings, and the like. Hence, a method of re-using the document button.html as one widget in another UI description language will be described below.

A document UISample1.html as document example 2 shown in FIG. 14 is an example of a UI description language written using the same language specification as the document button.html as document example 1 in FIG. 13.

In FIG. 14, a <cmm:CustomControl> element in (1) means a widget. However, this tag itself does not mean any practical widget such as a button, slider, or the like. The practical contents of the widget are designated by a "definition" attribute. The value of the "definition" attribute in (1) is "button.html". That is, (1) means that the aforementioned document button.html is referred to, and the "button" described by button.html is allocated on the screen of this UI. A "style" attribute has the same meaning as that of the "style" attribute in document example 1, and (1) represents that the button described in button.html is allocated at a position separated by 62 points from the top of the screen and by 40 points from the left of the screen.

The same applies to a <cmm:CustomControl> element in (2). Since the "definition" attribute has the same value "button.html", it indicates that the same button should be allocated. However, (2) has a different allocation position from (1) based on its "style" attribute. Therefore, (1) and (2) allocate a total of two buttons at different positions.

The <cmm:CustomControl> element in (2) further has <cmm:property> elements in (3) and (4). These elements represent instructions to replace specific attribute values in the widget description document designated by the "definition" attribute (i.e., button.html in this case). A "targetID" attribute designates an ID of an object in the widget description document. An attribute value "ImageUp" indicates an object having "ImageUp" as an ID in button.html (i.e., the <img> element in (7) of document example 1). A "targetattribute" attribute designates which of the attribute values of that designated object are to be replaced. Since the attribute value is "src", this represents an instruction to the effect that the value of the "src" attribute of the <img> element in (7) of document example 1 should be replaced. A "value" attribute in the last line is a value to be replaced. Since the attribute value is "images/up2.bmp", (3) consequently represents an instruction to replace the value of the "src" attribute of the <img> element in (7) of document example 1 by "images/up2.bmp" (i.e., another bitmap). Likewise, (4) represents an instruction to replace the value of the "src" attribute of the <img> element in (8) of document example 1 by "images/down2.bmp".

As described above, the <cmm:CustomControl> element in (2) of FIG. 14 is expressed as a button using bitmaps different from those described in button.html shown in FIG. 13. On the other hand, since the <cmm:CustomControl> element in (1) of FIG. 14 does not have any <cmm:property> element as a child element, it is expressed, intact, as a button using the bitmaps and the like described in button.html in FIG. 13.

Figure 5:
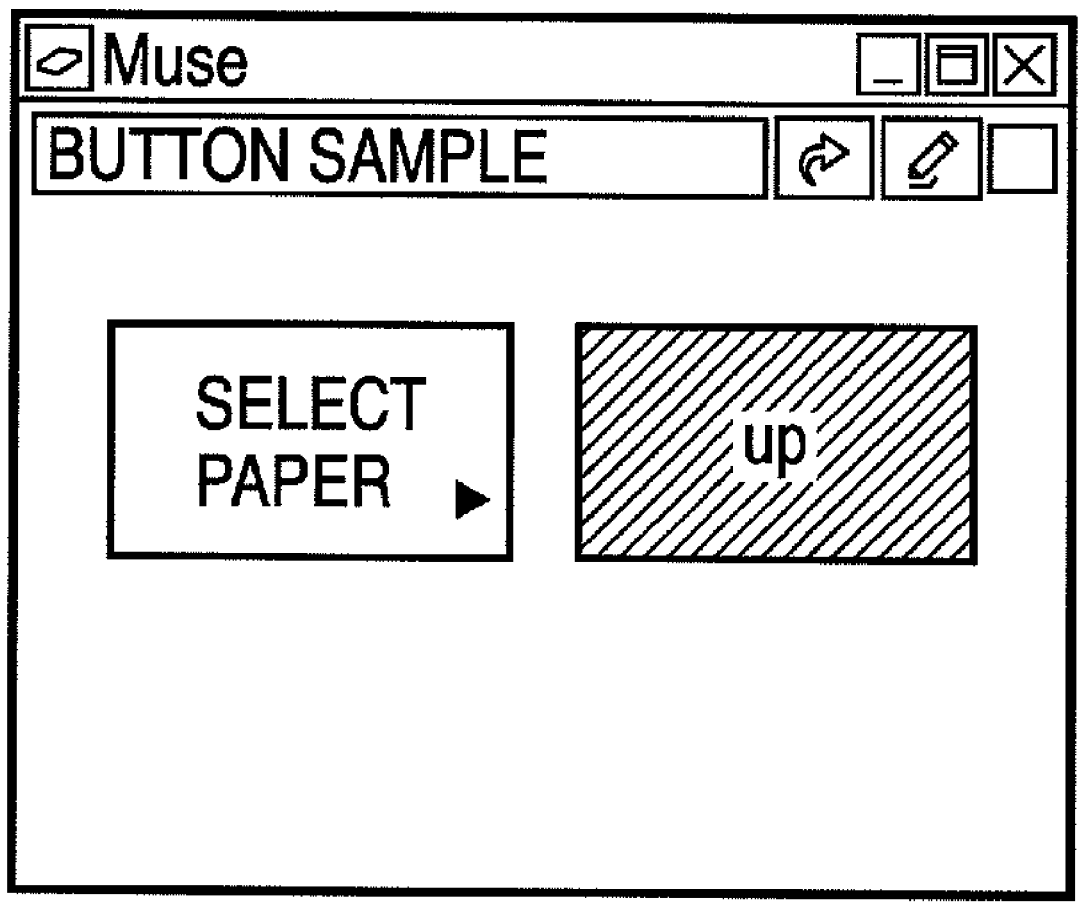
FIG. 5 shows a display example upon execution by the browser of a user interface description document that describes allocation of two buttons.

When the document UISample1.html as document example 2 is executed by the browser 302, two buttons which have different pictures and are allocated at different positions are displayed, as shown in FIG. 5. Since each of these buttons acts, as described in button.html, its display state is switched to the depressed state when the mouse button is held down, and is returned to the normal display state when the mouse button is released.

The processing procedure when the browser 302 executes the UI description document UISample1.html shown in FIG. 14 will be described below with reference to the flowchart of FIG. 6.

The browser 302 parses the UI description document UISample1.html (step S601). After that, the browser 302 checks if the description includes a widget allocation description (i.e., <cmm:CustomControl> elements (step S602)). If such a widget allocation description is not found, the browser 302 generates data that expresses the UI description contents as a tree structure, and holds it in the RAM 202 (step S603).

On other hand, if such widget allocation description is found, the browser 302 acquires the URI of that description document from the "definition" attribute, and acquires and parses the description document (step S604). In the case of UISample1.html, since the URI designated by the "definition" attribute is "button.html", the browser 302 parses the document button.html. As a result of this parsing, the browser 302 generates data that expresses the widget description contents in a tree structure, and holds it in the RAM 202 (step S605). After that, the browser executes step S603, and connects the tree-structured data of the UI to that of the widget obtained in step S605.

The browser 302 displays the UI based on the tree-structured data of the UI obtained in this way (step S606). After displaying it, the browser 302 executes an operation according to the description of the behavior defined by the <cmm:interaction> element of document example 1 in response to an input event from the user and the like (step S607).

Figure 7:
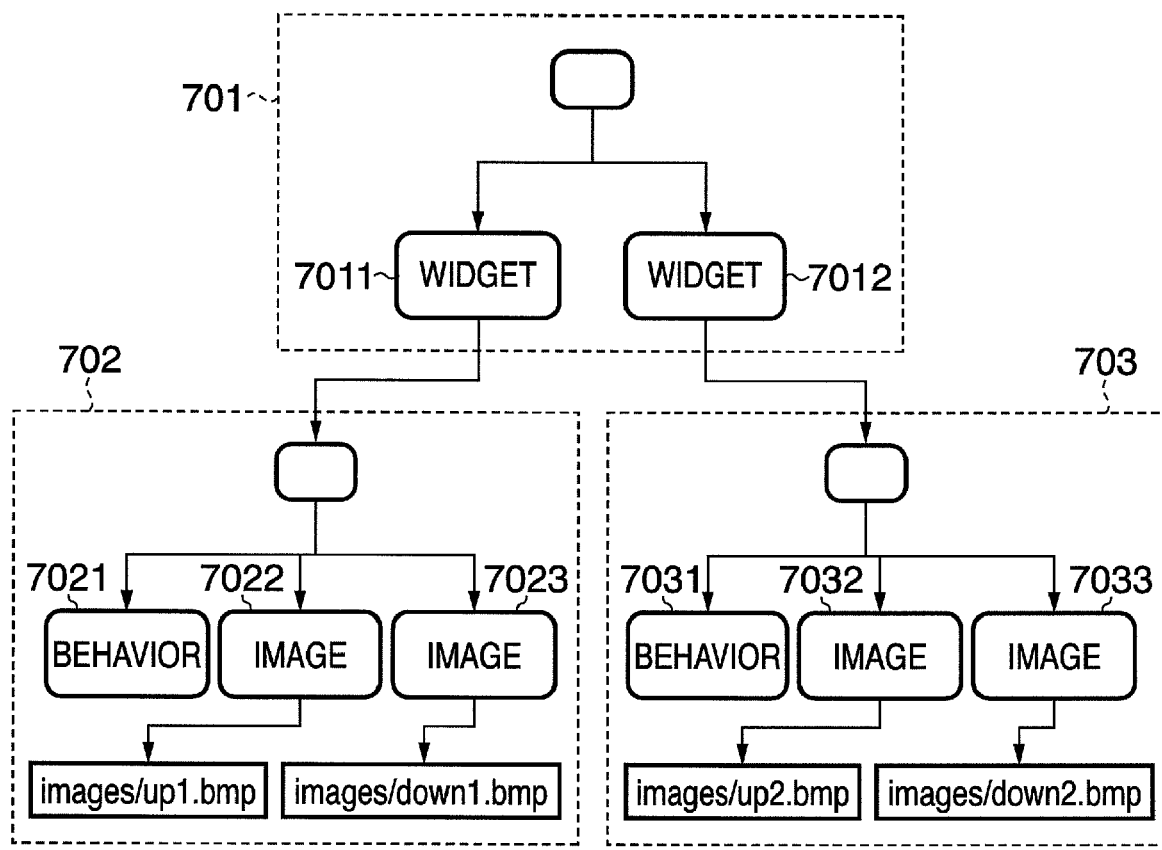
FIG. 7 shows an example of tree-structured data.

The tree-structured data generated in step S603 is as shown in FIG. 7. Reference numeral 701 denotes tree-structured data which expresses the parsing result of the UI description document UISample1.html. Reference numerals 7011 and 7012 denote objects in memory respectively corresponding to the <cmm:CustomControl> elements in (1) and (2) of document example 2. Reference numerals 702 and 703 denote tree-structured data that respectively express the parsing result of button.html. The tree-structured data 702 corresponds to button.html designated from the <cmm:CustomControl> element in (1) of document example 2, and the tree-structured data 703 corresponds to button.html designated from the <cmm:CustomControl> element in (2) of document example 2.

Reference numerals 7022 and 7023 denote objects in memory respectively corresponding to the <img> elements in (7) and (8) of document example 1. These objects respectively hold path character strings "images/up1.bmp" and "images/down1.bmp" of the bitmap files designated by the "src" attribute values.

Reference numerals 7032 and 7033 denote objects in memory respectively corresponding to the <img> elements in (7) and (8) of document example 1. Since the descriptions in (3) and (4) of document example 2 instruct to replace the "src" attribute values, these objects respectively hold "images/up2.bmp" and "images/down2.bmp" as character strings after replacement.

The display processing in step S606 is executed as follows. Of the objects which belong to the tree-structured data in FIG. 7, the objects 7022, 7023, 7032, and 7033 are to be displayed. Since the bitmap files that these objects display are determined, the rest indicates the display position.

A method of calculating the display position of the bitmap of the object 7022 will be described below. From the "style" attribute value in (7) of document example 1, the bitmap display position in the widget button.html is (top1, left1)=(0, 0). However, since this widget itself has a display position (top0, left0)=(62, 40), the final display position of the bitmap of the object 7022 is determined by:

(top, left)=(top0+top1, left0+left1)=(62+0, 40+0)=(62, 40)

Likewise, the display positions of the bitmaps of the objects 7023, 7032, and 7033 are:

7023: (top, left)=(62+0, 40+0)=(62, 40)
7032: (top, left)=(62+0, 220+0)=(62, 220)
7033: (top, left)=(62+0, 220+0)=(62, 220)

With the above processing, the widget description document of the button which is created once can be re-used many times in other UI description documents. Furthermore, using the property setting description ((3) and (4) of document example 2), the attributes of each individual allocated widget can be changed as needed (e.g., the bitmap file can be replaced), while re-using the basic properties of the button, intact.

Second Embodiment

In the first embodiment, the behavior (changing to an appearance of the depressed state if pressed) of the widget "button" itself is described as in document example 1 (button.html). However, the description of the UI on which widgets are allocated does not include any description of the behavior as in document example 2 (UISample1.html). In general, however, the description of the UI normally includes operations for operating allocated widgets as behaviors of the UI. For example, a behavior that appears often in Ui's is one in which other widgets are disabled if a given button is pressed. Hence, the second embodiment will explain the description method of the UI description document that implements operations of widgets, and the processing method by the browser.

Figure 8:
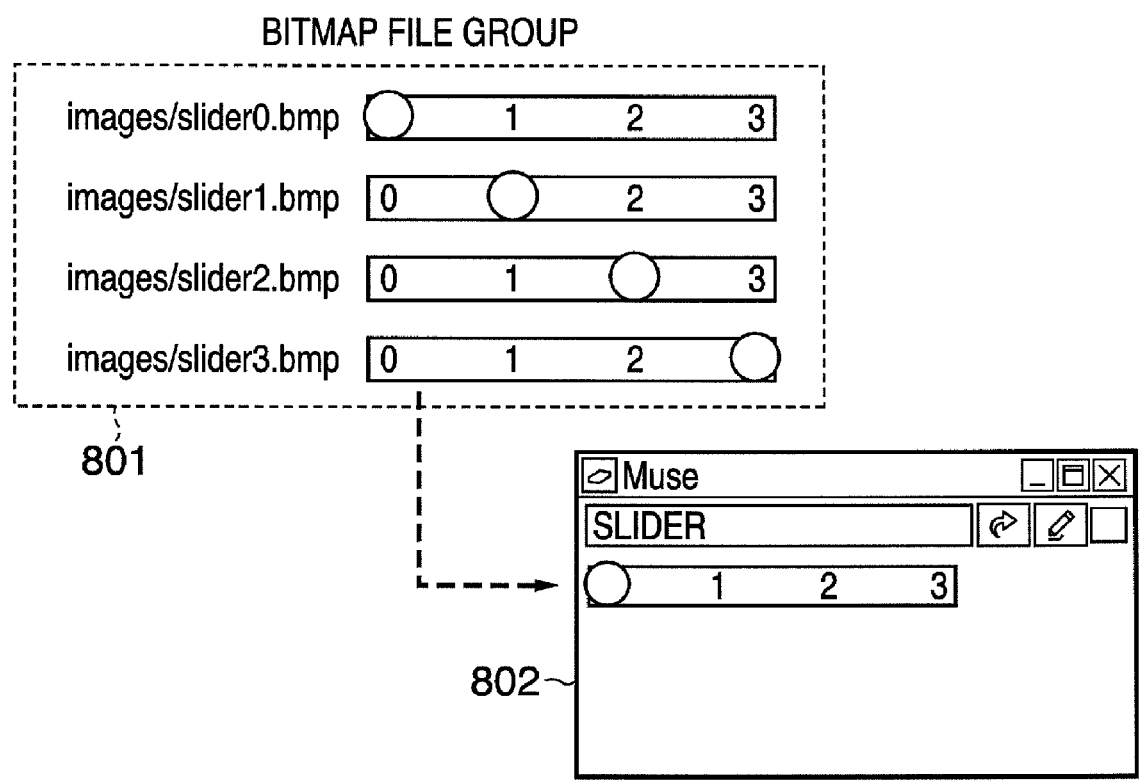
FIG. 8 shows bitmap files which configure a slider, and a display example upon execution by the browser of a user interface description document that describes the slider.

A widget will be exemplified using a slider. A document slider.html as document example 3 shown in FIGS. 15A to 15C describes a slider using a UI description language. In this document, <img> images in (9) to (12) are images which express a slider as "output information". This indicates that four bitmap files should be created, as denoted by 801 in FIG. 8. The four bitmap files express images having different knob positions for the sliders. All of these bitmap files are allocated to overlap each other at a position (top, left)=(0, 0). Other than (9), since the value of the "visibility" attribute is "hidden", these images are hidden when in an initial state. Therefore, the document slider.html is executed by the browser 302, as denoted by 802 in FIG. 8.

The behavior of this widget is described using a <cmm:interaction> element and its child elements. In document example 3, since there are four <cmm:state> elements, this means that the slider has four states. Since there are four knob positions, the states are defined in correspondence with the respective knob positions.

The <cmm:state> element in (1) means a state in which the knob is located at the leftmost position. In this state, three events in (2), (3), and (4) and corresponding actions are described.

(2) describes an "enter this state" event, and a corresponding action is to display an object having "imgSlider0" as an ID (i.e., the <img> element in (9)).

(3) describes an "exit this state" event, and a corresponding action is to hide the <img> element in (9).

An event "operation.MoveRight" in (4) is an "an operation "MoveRight" instruction was issued to this widget" event.

In this way, an operation for the widget is expressed as an event when viewed from the widget. An action to this event is described by a <cmm:goto> element <cmm:goto> in (5). This is an action to transit to a state designated by an "href" attribute (in this case, "state1"). Since the same descriptions are made for the three remaining states, a detailed description thereof will not be given.

To summarize this behavior as a whole, "a corresponding bitmap is displayed in a certain state, and upon issuance of an operation instruction such as "MoveRight", "MoveLeft", or the like, the state transits to another state". Since "MoveRight" and "MoveLeft" mean operations "to move the slider to right/left", an image having a different knob position is selectively displayed in response to such operations in this behavior.

An example of a UI description language which allocates the widget (i.e., the slider) will be described below.

On a UI described by document example 4 (UISample2.html) shown in FIG. 16, three widgets in (3), (4), and (5) are allocated. Of these widgets, (3) and (4) represents buttons defined by XHTML. In (3) and (4), <input> is an example of "input information". This tag means a button in XHTML. Since this tag is a button, it allows input by clicking. Since this tag means display of the button, it also serves as "output information". Moreover, (5) is the slider defined by document example 3. Furthermore, as a behavior, one state will now be defined, and two events and corresponding actions (1) and (2) will now be described.

First, (1) is an action to be taken in response to an "an object having "Left" as an ID, i.e., the button in (3) is clicked" event. Since the action is defined by <cmm:operate>, it represents an operation on the object. The operation name is "MoveLeft" of the "name" attribute, and an object to be operated is the slider in (5).

Likewise, (2) is an action to be taken in response to a "the button in (4) was clicked" event, and indicates that "operation instruction "MoveRight" to the slider in (5) should be issued".

In this way, as the description of the UI, operations for the allocated widgets can be described.

The processing when the browser 302 executes the UI description document UISample2.html will be described below.

Figure 6:
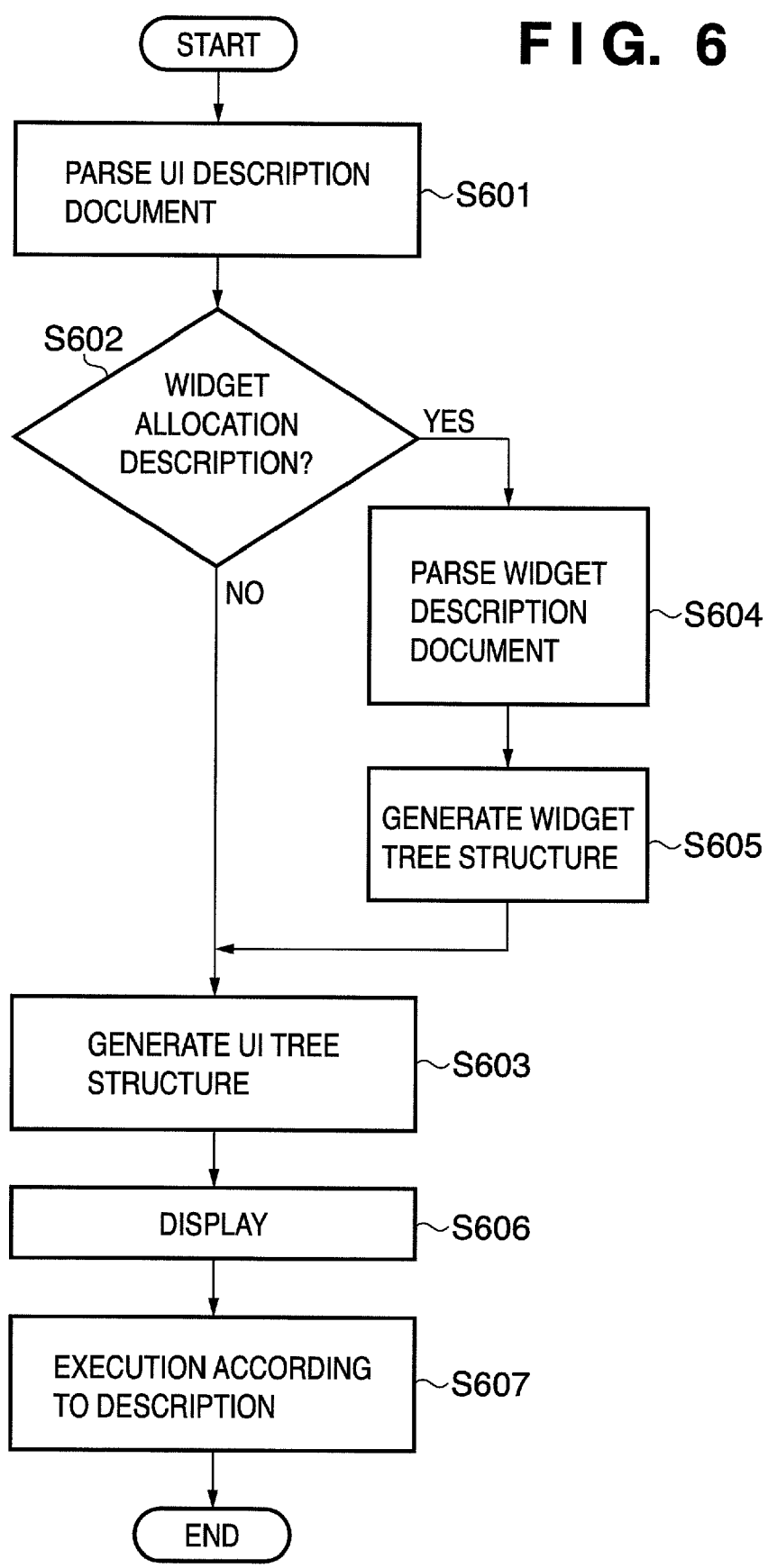
FIG. 6 is a flowchart for explaining the operation of the browser.
Figure 9:
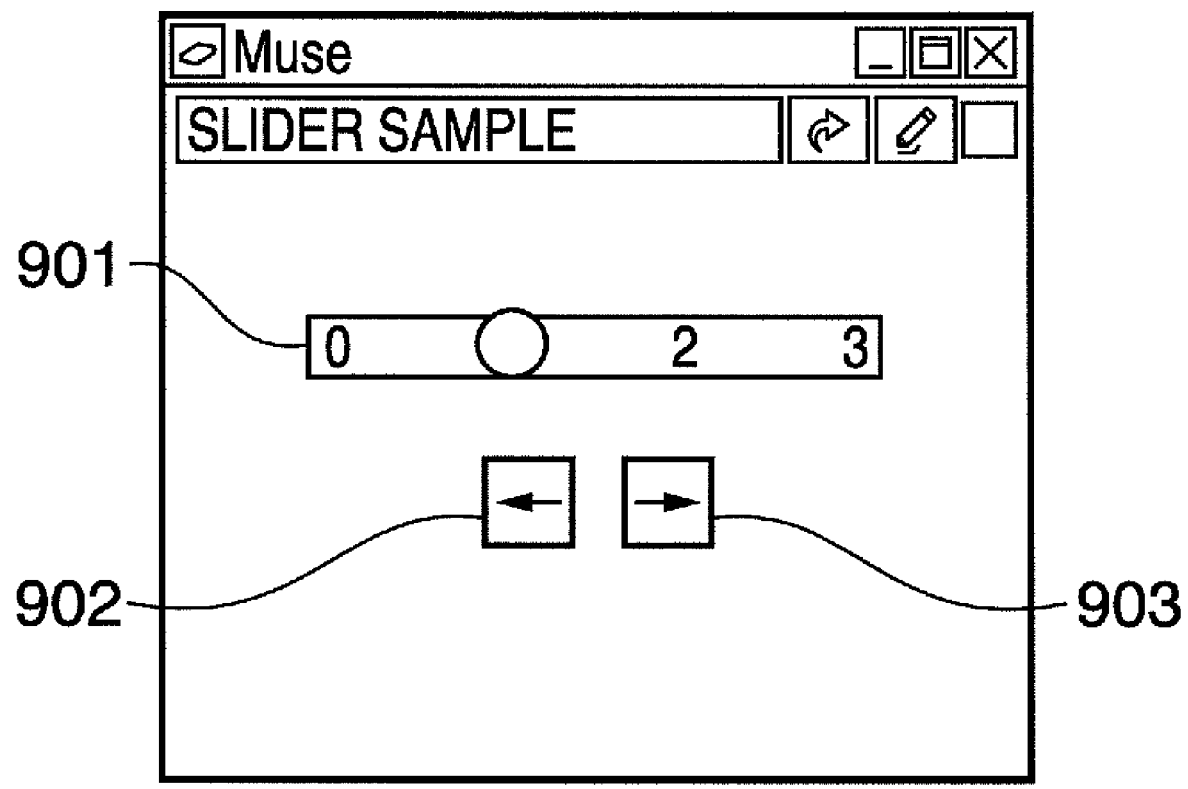
FIG. 9 shows a display example upon execution of a user interface description document by the browser.

The basic processing procedure is the same as that described in the first embodiment based on FIG. 6. The display screen of the browser to be displayed in step S606 is as shown in FIG. 9. Reference numeral 901 denotes the widget in (5) of document example 4; and 902 and 903, the buttons described in (4) and (3). As a description of the processing for implementing operations for the widgets, the contents of "execution according to description" in step S607 will be described in detail below.

Figure 10:
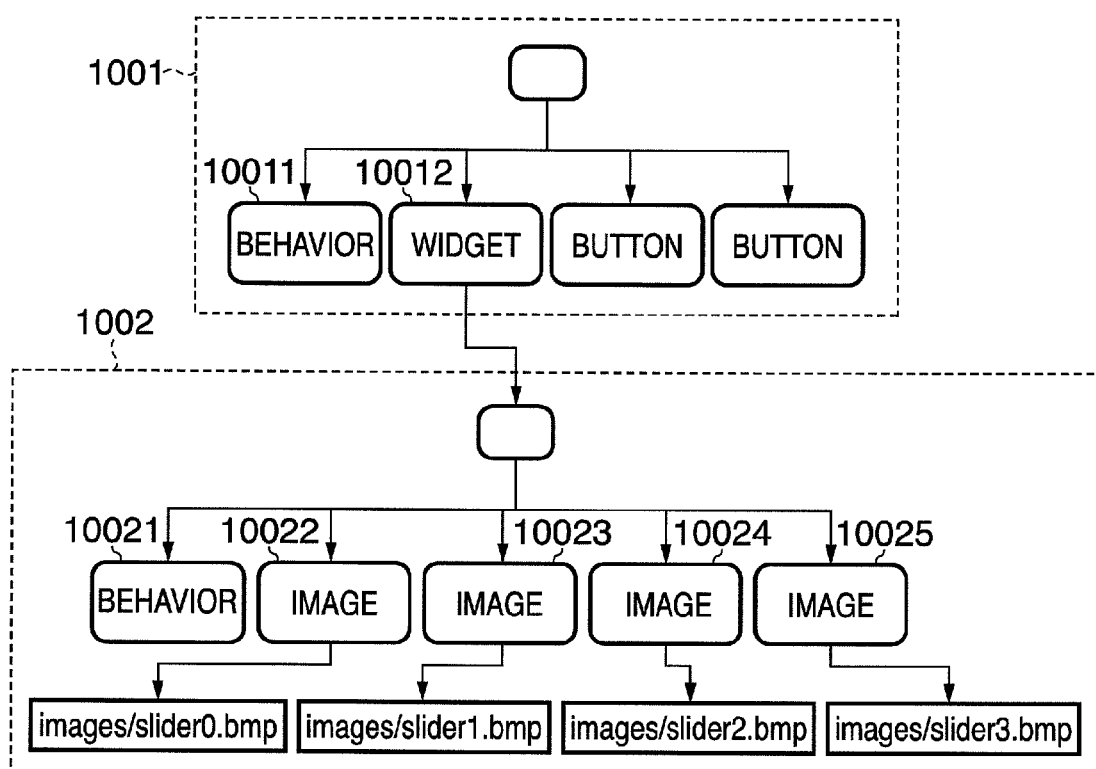
FIG. 10 shows an example of tree-structured data.

FIG. 10 shows an example of tree-structured data generated by the processing in step S603. Reference numeral 1001 denotes tree-structured data which expresses the contents of UISample2.html; and 1002, tree-structured data which expresses the contents of slider.html. An object 10011 holds information associated with the behavior described by the <cmm:interaction> element and its child elements in document example 4. Upon pressing of the button 903, the object 10011 attempts to execute the action in (2) of document example 4. As described above, this is the operation "MoveRight" to the widget (5) in document example 4.

An object 10012 corresponds to the widget (5) in document example 4. The object 10012 converts this operation into an "operate.MoveRight" event, and notifies an object 10021 which manages the behavior of the slider of this event. Upon catching the event "operate.MoveRight", the object 10021 executes the action in (5) of document example 3 in accordance with the description in (4) of document example 3, and transits the current state to the state in (6) of document example 3. Upon transition, since the "exit this state" event in (3) of document example 3 occurs, an action in that event is executed to hide the bitmap in (9) of document example 3 ("Hide" operation).

On the other hand, after transition to the state in (6) of document example 3, the action in (8) of document example 3 corresponding to the "enter this state" event is executed based on the description in (7) of document example 3, and the bitmap in (10) of document example 3 is displayed ("Show" operation).

In this way, the knob of the slider appears to move to the right by one position.

With the processing described above, the description document of the widget (i.e., the slider), which is created once, can be re-used in another UI description document, and the operations for that widget can be implemented.

Third Embodiment

In the first and second embodiments, the widgets defined in the UI description document are configured by only images (bitmaps), but text and voice or sound may be included. As an example including a sound, a button that makes a sound upon clicking will be exemplified.

Figure 11:
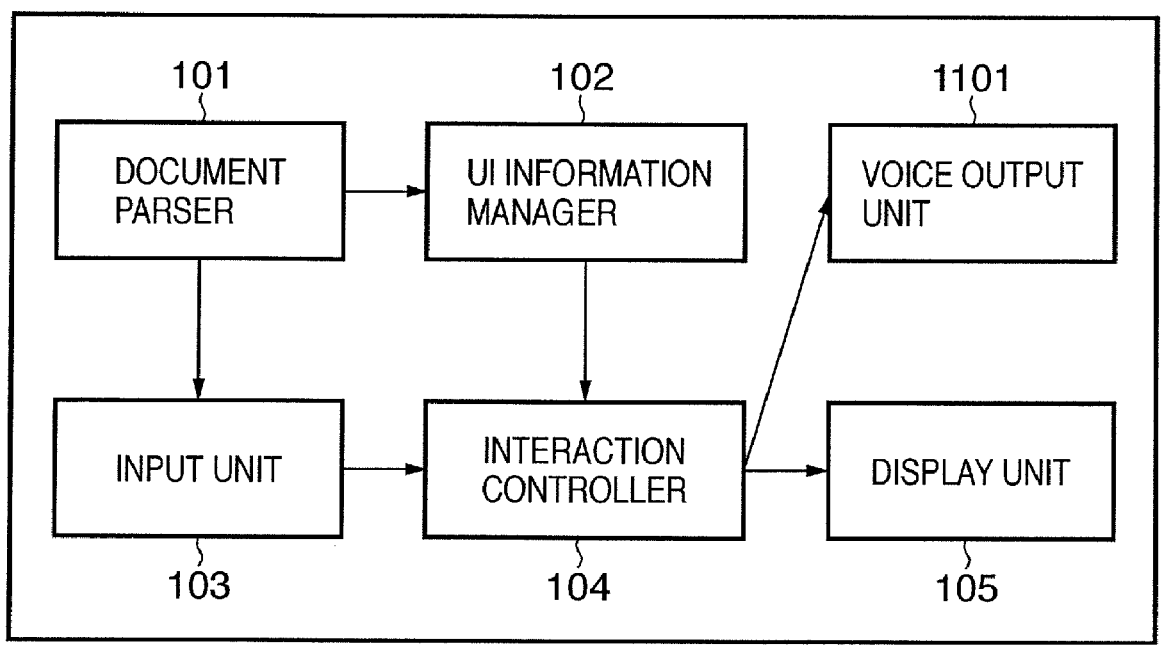
FIG. 11 is a block diagram showing the functional arrangement of the browser.

FIG. 11 is a block diagram showing the functional arrangement of a browser according to this embodiment. Basically, the arrangement shown in FIG. 11 is the same as that shown in FIG. 1, except that a voice output unit 1101 is added in FIG. 11.

Document example 5 (SoundButton.html) shown in FIG. 17 is prepared by adding a description of a sound output to document example 1 in FIG. 13. (2) is a sound output widget required to play back a sound file designated by "sound/chime1.wav" as an "src" attribute value. (1) is an operation ("Play") to play back a sound to the widget in (2). That is, with this behavior, when the mouse button is held down on a bitmap, that bitmap is switched to a bitmap in a depressed state, and a sound designated by "sound/chime1.wav" is played back at the same time.

Document example 6 (UISample3.html) shown in FIG. 18 is an example of a UI description document using SoundButton.html as document example 5 in FIG. 17. In this document, property settings in (1) are added to UISample1.html as document example 2, and "SoundButton.html" is designated as a "definition" attribute of the widget definition. As in UISample1.html as document example 2, two buttons are allocated, and one bitmap is replaced by another by the property settings. In addition, a sound file to be played back upon clicking the mouse button is replaced by "sound/chime2.wav" by the property settings in (1). As a result, the appearances of the two buttons change, and different sounds are played back upon clicking of the mouse button.

Fourth Embodiment

In the first to third embodiments, the cases have been described wherein the attribute values associated with outputs such as a display output, sound output, and the like in the widget description document are replaced. However, the present invention can also be applied to an input event from the user. For example, a case will be examined below wherein a widget description document is described using VoiceXML, and includes the following sound input element <field>.

<field name="input">
<grammar src="grammar1.srgs"/>
</field>

In this case, by overwriting the value of an "src" attribute of the element <grammar> that designates a speech recognition grammar file corresponding to that sound input element, speech recognition can be made using different speech recognition methods for respective widgets.

Fifth Embodiment

In the first to fourth embodiments, the cases have been described wherein the browser, widget description document, and UI description document which uses that widget description document exist together on one PC. However, the widget description document and UI description document may exist on computers different from the PC on which the browser is running.

Figure 12:
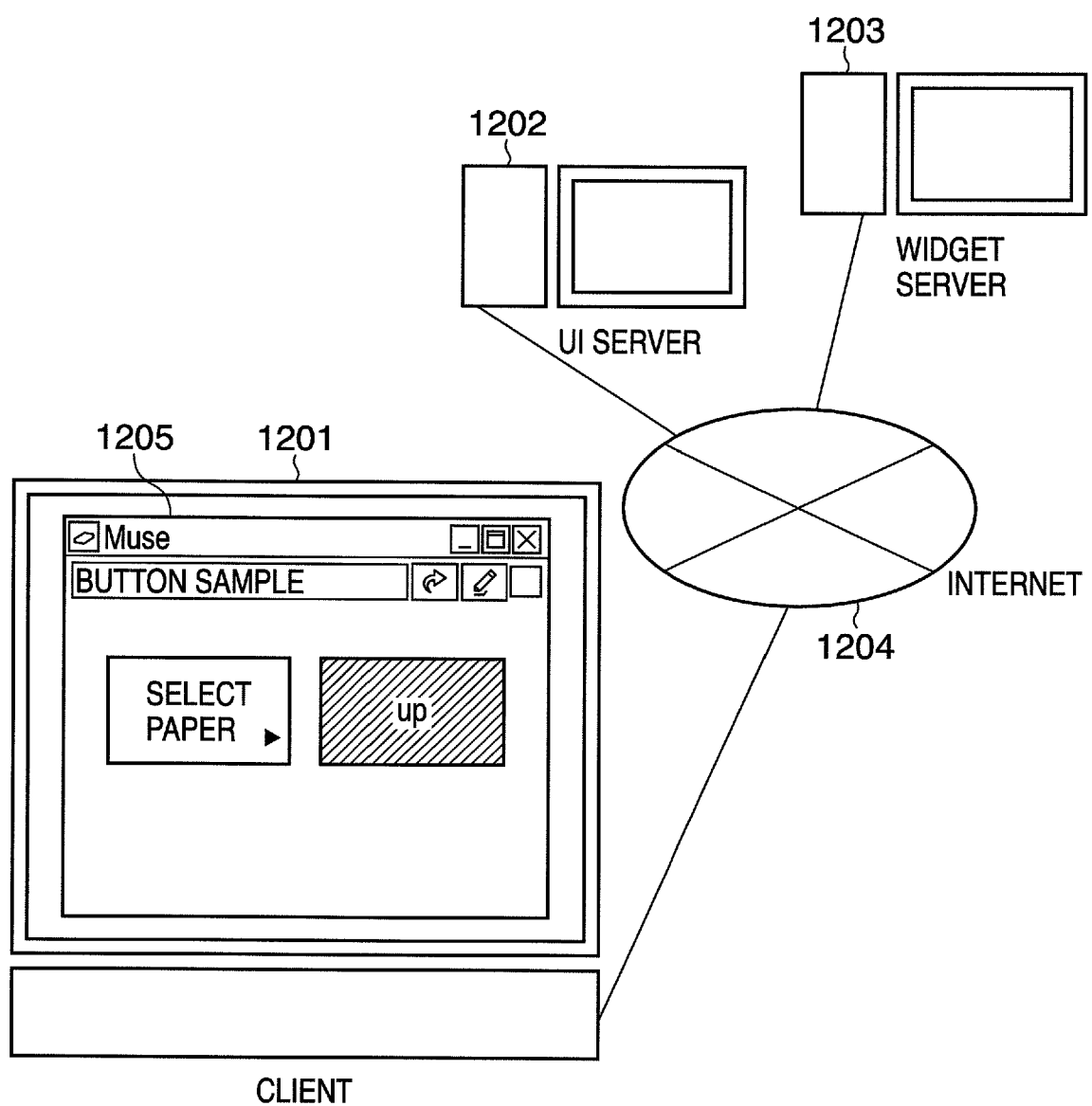
FIG. 12 shows a system configuration example according to the fifth embodiment.

FIG. 12 shows an example of the system arrangement according to this embodiment. A system shown in FIG. 12 is configured by connecting a client PC 1201 on which a browser 1205 runs, a UI server 1202, and a widget server 1203 via the Internet 1204.

The UI server 1202 holds document example 7 (UISample4.html) shown in FIG. 19. The widget server 1203 holds button.html as document example 1. The browser 1205 downloads UISample4.html via the Internet 1204. After that, the processing according to the flowchart in FIG. 6 starts. In step S602 to check the presence/absence of the widget allocation description, the "presence" is determined based on (1) and (2) in document example 7. In this case, the "definition" attribute value includes a description "http://widgets/button.html". For this reason, the browser 1205 accesses the server 1203 designated by "http://widgets/" via HTTP, and downloads button.html via the Internet.

In this way, the widget can be re-used via the network.

Sixth Embodiment

In the first to fifth embodiments, the XHTML-based UI description language is used. Alternatively, other UI description languages such as SVG, VoiceXML and the like may be used.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-205312, filed Jul. 27, 2006, which is hereby incorporated by reference herein in its entirety.

What is claimed is:

1. An information processing apparatus comprising:
   a storage unit adapted to store first and second user interface description documents including input information, output information, and control information;
   a parsing unit adapted to parse the first and second user interface description documents;
   a management unit adapted to manage user interface information obtained as a result of parsing by said parsing unit;
   an input unit adapted to control data input, according to the input information;
   an output unit adapted to control data output, according to the output information; and
   a control unit adapted to control operation of a user interface, according to the control information,
   wherein the first user interface description document includes an instruction to refer to the second user interface description document, wherein the language specification of the first user interface description document is written using the same language specification as the second user interface description document from among a plurality of language specifications using a specific description language describing a user interface,
   said parsing unit parses the first user interface description document and the second user interface description document as a reference destination of the first user interface description document,
   said management unit integrates and manages user interface information of the parsed first and second user interface description documents,
   said control unit implements operation, according to the control information of the second user interface description document,
   the first user interface description document further includes a designation which defines, as a widget, a user interface described by the second user interface description document as the reference destination, and is associated with an operation of the widget, and has a conversion part that converts execution of the operation of the widget into an event of the second user interface description document, and has a notification part that notifies the converted event to the second user interface description document,
   the second user interface description document includes descriptions of an event corresponding to the description associated with the operation and an action corresponding to the event in the control information, and
   said control unit executes an action in response to the event converted by the conversion part in accordance with the control information in the second user interface description document.

2. The apparatus according to claim 1, wherein the output information is display information, and said output unit displays an image.

3. The apparatus according to claim 1, wherein the output information is sound output information, and said output unit outputs a sound.

4. The apparatus according to claim 1, wherein the input information is information regarding a graphical user interface, and said input unit performs input of the graphical user interface.

5. The apparatus according to claim 1, wherein the input information is sound input information, and said input unit inputs a sound.

6. The apparatus according to claim 1, further comprising a reception unit which exists on a device different from the first and second user interface description documents, and which is adapted to acquire the first and second user interface description documents via a network.

7. A user interface control method executed by an information processing apparatus, which comprises:
   a storage unit adapted to store first and second user interface description documents including input information;
   a parsing unit adapted to parse the first and second user interface description documents;
   a management unit adapted to manage user interface information obtained as a result of parsing by the parsing unit;
   an input unit adapted to control data input, according to the input information;
   an output unit adapted to control data output, according to the output information; and
   a control unit adapted to control operation of a user interface, according to the control information,
   wherein the first user interface description document includes an instruction to refer to the second user interface description document, wherein the language specification of the first user interface description document is written using the same language specification as the second user interface description document from among a plurality of language specifications using a specific description language describing a user interface, the first user interface description document further includes a designation which defines, as a widget, a user interface described by the second user interface description document as the reference destination, and is associated with an operation of the widget, and has a conversion part that converts execution of the operation of the widget into an event of the second user interface description document, and has a notification part that notifies the converted event to the second user interface description document, and the second user interface description document includes descriptions of an event corresponding to the description associated with the operation and an action corresponding to the event in the control information, said method comprising:

parsing, by the parsing unit, of the first user interface description document and the second user interface description document as a reference destination of the first user interface description document;

integrating and managing, by the management unit, of user interface information of the parsed first and second user interface description documents;

implementing, by the control unit, of an operation, according to the control information of the second user interface description document; and executing, by the control unit, of an action in response to the event converted by the conversion part in accordance with the control information in the second user interface description document.

8. A non-transitory computer-readable medium storing a program for making a computer execute a user interface control method according to claim 7.

9. The apparatus according to claim 1, wherein the first and second user interface description documents conform to the Extensible Hypertext Markup Language (XHTML) standard.

10. The apparatus according to claim 1, wherein the first and second user interface description documents conform to the Scalable Vector Graphic (SVG) standard.

11. The apparatus according to claim 1, wherein the first and second user interface description documents conform to the Voice Extensible Markup Language (VoiceXML) standard.

* * * * *